United States Patent
Fornos et al.

(10) Patent No.: US 11,179,894 B2
(45) Date of Patent: *Nov. 23, 2021

(54) MANAGING THERMAL CONTRIBUTIONS BETWEEN LAYERS DURING ADDITIVE MANUFACTURING

(71) Applicant: HEWLETT-PACKARD DEVELOPMENT COMPANY, L.P., Houston, TX (US)

(72) Inventors: Pol Fornos, Sant Cugat del Valles (ES); Sergio Puigardeu Aramendia, Corvallis, OR (US); Xavier Vilajosana, Sant Cugat del Valles (ES)

(73) Assignee: Hewlett-Packard Development Company, L.P., Spring, TX (US)

(*) Notice: Subject to any disclaimer, the term of this patent is extended or adjusted under 35 U.S.C. 154(b) by 224 days.

This patent is subject to a terminal disclaimer.

(21) Appl. No.: 16/094,174

(22) PCT Filed: May 12, 2016

(86) PCT No.: PCT/EP2016/060665
§ 371 (c)(1),
(2) Date: Oct. 16, 2018

(87) PCT Pub. No.: WO2017/194113
PCT Pub. Date: Nov. 16, 2017

(65) Prior Publication Data
US 2019/0126606 A1    May 2, 2019

(51) Int. Cl.
*B29C 64/393* (2017.01)
*B29C 64/165* (2017.01)
(Continued)

(52) U.S. Cl.
CPC .......... *B29C 64/393* (2017.08); *B29C 64/124* (2017.08); *B29C 64/135* (2017.08);
(Continued)

(58) Field of Classification Search
CPC .......................... B29C 64/386; B29C 64/393
See application file for complete search history.

(56) References Cited

U.S. PATENT DOCUMENTS

| | | | | |
|---|---|---|---|---|
| 5,427,733 A | * | 6/1995 | Benda | B33Y 40/00 419/1 |
| 5,730,817 A | * | 3/1998 | Feygin | B32B 37/1045 156/64 |

(Continued)

FOREIGN PATENT DOCUMENTS

| | | |
|---|---|---|
| CN | 101678613 | 3/2010 |
| DE | 112004000301 T5 | 1/2006 |

(Continued)

OTHER PUBLICATIONS

Hu, et al; "Modelling and Measuring the Thermal Behaviour of the Molten Pool in Closed-Loop Controlled Laser-Based Additive Manufacturing"; Jul. 16, 2012.

(Continued)

*Primary Examiner* — Atul P. Khare
(74) *Attorney, Agent, or Firm* — HP Inc. Patent Department

(57) ABSTRACT

In an example, a method includes forming a first layer of build material to be processed in object generation and selectively applying at least one print agent on to the first layer based on a print instruction for the first layer. Energy may be applied to the first layer to cause fusion in at least a region thereof, and at least one temperature associated with a thermal contribution of the first layer to a subsequent layer of build material to be processed in object generation may be measured. It may be determined if a temperature condition indicative of a departure from an anticipated thermal contribution of the first layer to a region of subsequent layer exists. If such a temperature condition does exist, a print (Continued)

instruction for applying print agent to the region of the subsequent layer based on the temperature condition may be determined.

18 Claims, 3 Drawing Sheets

(51) Int. Cl.
   B33Y 50/02      (2015.01)
   B29C 64/386     (2017.01)
   B29C 64/124     (2017.01)
   B29C 64/20      (2017.01)
   B33Y 30/00      (2015.01)
   B33Y 10/00      (2015.01)
   B29C 64/135     (2017.01)
   B29C 64/153     (2017.01)

(52) U.S. Cl.
   CPC ............ *B29C 64/165* (2017.08); *B29C 64/20* (2017.08); *B29C 64/386* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 7,073,442 B2 | 7/2006 | Fedor et al. | |
| 8,535,036 B2 | 9/2013 | Hopkinson et al. | |
| 9,073,265 B2* | 7/2015 | Snis | G05D 23/00 |
| 10,632,672 B2* | 4/2020 | Vilajosana | B29C 64/393 |
| 10,730,282 B2* | 8/2020 | De Pena | B29C 41/52 |
| 10,766,197 B2* | 9/2020 | DeFelice | B33Y 30/00 |
| 2007/0241482 A1 | 10/2007 | Giller et al. | |
| 2014/0252685 A1* | 9/2014 | Stucker | B29C 64/268 |
| | | | 264/401 |
| 2014/0314613 A1* | 10/2014 | Hopkinson | B33Y 30/00 |
| | | | 419/55 |
| 2014/0371895 A1 | 12/2014 | Sadusk | |
| 2015/0094394 A1 | 4/2015 | Jung et al. | |
| 2016/0151973 A1* | 6/2016 | Juan Jover | B29C 64/386 |
| | | | 264/462 |
| 2016/0271884 A1* | 9/2016 | Herzog | B23K 15/02 |
| 2016/0332374 A1* | 11/2016 | Nauka | B29C 64/165 |
| 2018/0141278 A1* | 5/2018 | Adzima | B29C 64/386 |
| 2018/0311757 A1* | 11/2018 | Bucknell | B29C 64/264 |
| 2019/0095555 A1* | 3/2019 | Lopez | G06F 30/17 |
| 2019/0111626 A1* | 4/2019 | Hierro Domenech | B33Y 10/00 |
| 2019/0111630 A1* | 4/2019 | Tarradas | B29C 64/295 |

FOREIGN PATENT DOCUMENTS

| | | |
|---|---|---|
| WO | WO-2015106816 | 7/2015 |
| WO | WO-2015108546 | 7/2015 |
| WO | WO-2015108547 | 7/2015 |
| WO | WO-2015136278 | 9/2015 |
| WO | WO-2015167520 | 11/2015 |
| WO | WO-2016026706 | 2/2016 |

OTHER PUBLICATIONS

"Polyjet Multi-Material 3D Printing"; Jan. 16, 2015; http://usglobalimages.stratasys.com/Main/Files/Technical%20Application%20Guides_TAG/TAG_PJ_MultiMaterial.pdf?v=635736773572893799.

* cited by examiner

MANAGING THERMAL CONTRIBUTIONS BETWEEN LAYERS DURING ADDITIVE MANUFACTURING

BACKGROUND

Additive manufacturing techniques may generate a three-dimensional object on a layer-by-layer basis through the solidification of a build material. In examples of such techniques, build material is supplied in a layer-wise manner and a solidification method may include heating the layers of build material to cause melting in selected regions. In other techniques, other solidification methods, such as chemical solidification methods or binding materials, may be used.

BRIEF DESCRIPTION OF DRAWINGS

Non-limiting examples will now be described with reference to the accompanying drawings, in which.

DETAILED DESCRIPTION

Figure 1:
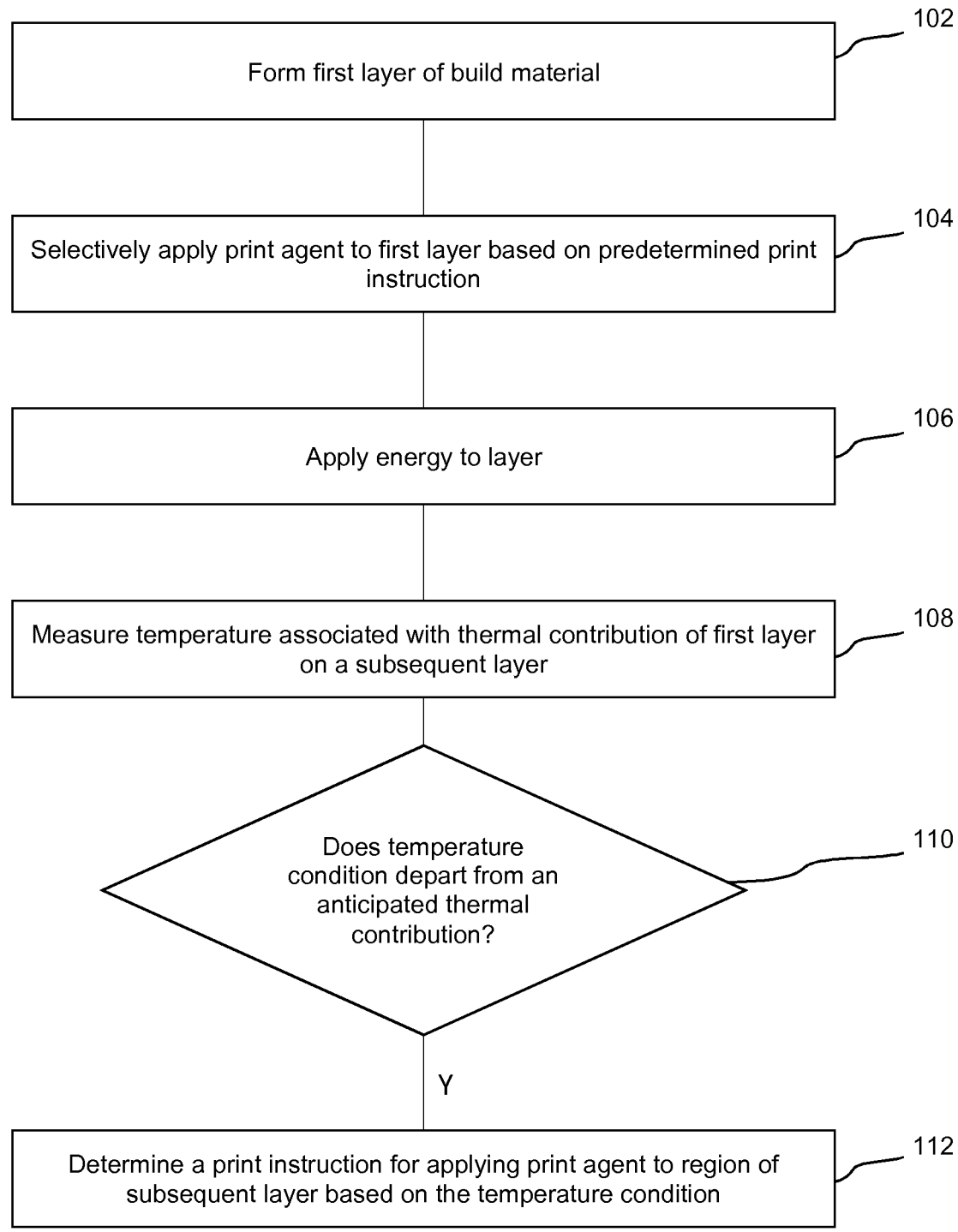
FIG. 1 is a flowchart of an example method of determining a print instruction for applying print agent.

Additive manufacturing techniques may generate a three-dimensional object through the solidification of a build material. In some examples, the build material may be a powder-like granular material, which may for example be a plastic, ceramic or metal powder. The properties of generated objects may depend on the type of build material and the type of solidification mechanism used. Build material may be deposited, for example on a print bed and processed layer by layer, for example within a fabrication chamber.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat, light or some other energy) is applied to the layer, for example from an energy radiation source, the build material to which it has been applied coalesces and solidifies to form a slice of the three-dimensional object in accordance with the pattern. In other examples, coalescence may be achieved in some other manner.

In addition to a fusing agent, in some examples, a print agent may comprise a coalescence modifying agent (referred to as modifying or detailing agents herein after), which acts to modify the effects of a fusing agent for example by reducing or increasing coalescence or to assist in producing a particular finish or appearance to an object, and such agents may therefore be termed detailing agents. Modifying agents which reduce coalescence (for example, as they may reflect incident energy, not absorb energy as well as fusing agents, or are evaporated, which has a cooling effect) are termed fusion-reduction agents herein. Modifying agents which increase coalescence are termed fusion-enhancing agents herein. A coloring agent, for example comprising a dye or colorant, may in some examples be used as a fusing agent or a modifying agent, and/or as a print agent to provide a particular color for the object.

As noted above, additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define a portion of a respective layer of build material that is to be solidified or caused to coalesce by the additive manufacturing system.

FIG. 1 is an example of a method, which may be a method of additive manufacturing, comprising, in block 102, forming a first layer of build material to be processed in object generation. For example, a layer of build material may be provided on a print bed, either directly or overlaid on at least one previously formed layer (and in some examples, the previously formed layer may have been processed by the application of at least one print agent, and irradiated with energy from an energy source, for example, a heat lamp). Block 104 comprises selectively applying at least one print agent on to the first layer based on a print instruction for the first layer. For example, this may be according to a predetermined pattern, which may be a pattern derived from object model data representing an object to be generated by an additive manufacturing apparatus by fusing a build material. Such object model data may for example comprises a Computer Aided Design (CAD) model, and/or may for example be a STereoLithographic (STL) data file, and may for example specify a material distribution (e.g. identifying the solid portions) in a 'slice' of the object.

Block 106 comprises applying energy to the layer of build material, for example using an energy source to cause fusion in at least a region thereof. This may for example comprise applying heat, for example using a heat lamp, to the layer of build material, or irradiating the layer with light, microwave energy or the like.

Block 108 comprises measuring at least one temperature associated with the thermal contribution of the first layer to a subsequent layer of build material to be processed in object generation. In some examples, a plurality of temperatures over the surface of a layer of build material may be measured. For example, a layer of build material may be considered as a plurality of pixels, and each of a plurality of the pixels may be associated with a temperature measurement. In one example, the pixels may be in the order of 1-2 cm in length, dividing a print bed of around 30 cm by 40 cm into around a 32×32 matrix of pixels, although larger or smaller pixels could be formed. In some examples, the temperature of the first layer may be measured following processing thereof. In some examples, a subsequent layer of build material may be formed, for example overlying the agent treated and at least partially fused first layer, and the temperature of that subsequent layer may be measured, for example before any print agent is applied thereto. The temperature may be measured using any type of temperature sensor(s). In some examples the temperature may be measured using a thermal imaging camera, or an Infra-red (IR) camera.

Block 110 comprises determining, using at least one processor, if a temperature condition indicative of a departure from an anticipated thermal contribution of the first layer to a region of subsequent layer exists. Block 110 therefore considers 'inter-layer' temperature contributions, rather than 'intra-layer' temperature conditions (i.e. the temperature conditions as they pertain to a single layer). In some examples, determining if such a temperature condition exists may comprise comparing the temperature at each of at least one location(s) or region(s) over a layer with a modelled anticipated temperature for that location/region. This may for example comprise comparing a measured thermal map of the layer with a modelled anticipated thermal map, or comparing spatially aligned pixels thereof. In other examples, determining the temperature condition may comprise comparing the temperature at each of at least one location(s) or region(s) over a layer with a threshold temperature. The region may comprise part, but not all, of the subsequent layer.

In some examples, the temperature condition is indicative of a region of a layer of build material associated with an over-temperature condition, in other words the region may comprise a 'hot spot' on the layer. This could for example be at least one of an over-temperature relative to a predetermined threshold temperature for the layer, or may be an over-temperature relative to an anticipated temperature for that region, or may be an over-temperature relative to temperatures of the layer outside that region. In other words the temperature measurement(s) may be used to reveal actual or potential hot spots in the subsequent layer, which could indicate that fusing may be influenced, or in some examples, caused, in the subsequent layer not by (or not just by) application of print agent and subsequent provision of energy, but by the thermal contribution of the underlying first layer. In other examples, it may be indicative of the start of a process which could, over a number of subsequent layers, lead to or increase a risk of unintended fusing unless action is taken to counter the thermal condition. In such examples, therefore, the thermal condition may be indicative of a temperature which is hot enough to impact the processing of subsequent layers.

In some examples, there may be an initial set of print instructions associated with layers of an object to be generated, specifying amounts and/or placement of print agents for each layer. In some examples, amounts of print agent(s) to be applied to cause fusion in intended portions in the initial set of print instructions may be determined without reference to the resulting temperatures (or without reference to the resulting inter-layer temperatures). Such methods may for example rely on cooling between processing of layers to control or prevent the development of hot spots. However, in some examples, it may be the case that a thermal model of an object generation process is considered, for example to control the possibility that a first layer could impact the fusing of a subsequent layer in an unintended, or uncontrolled, manner. In practice, even if a thermal model is considered, the thermal behaviour of the layers of build material in object generation may depart from the model, for example due to variations in the thermal properties of the build material and/or print agents used (for example, build material may be recycled, and the thermal properties thereof may change over its life), or environmental conditions (including ambient temperature and humidity), an incomplete model or the like. Whether a thermal model is considered or not, therefore, it may be the case that the thermal contribution of a first layer to a subsequent layer can result in unintended consequences, which may include unintended fusing in the subsequent, or another, layer, unintended physical properties such as such as brittleness, loss of strength, loss of dimensional accuracy and/or increased roughness, or variations in the appearance of an object due to overheating/under heating during object formation.

However, in this example, if it is determined that a temperature condition indicative of a departure from an anticipated thermal contribution by the first layer exists, the method continues in block 112 by determining a print instruction for applying print agent to the region of subsequent layer based on the temperature condition. This may comprise modifying predetermined print instructions for applying print agent to the subsequent layer. In some examples, at least a portion of the predetermined print instructions is modified and at least a portion of the predetermined print instructions is unmodified. For example, if an over-temperature condition is identified, predetermined print instructions for a particular amount of print agent to be applied to the region of the over-temperature may be modified, for example to reduce an amount (which may be a number of drops, or a concentration) of fusing agent or fusion-enhancing agents, and/or to increase an amount of fusion-reduction agent. If an under-temperature condition is determined, an amount of fusing agent or fusion-enhancing agent may be increased, or an amount of fusion-reduction agent reduced. In some examples, determining a print instruction for applying print agent to the subsequent layer based on the temperature condition may comprise specifying a print agent within the print instructions with different energy absorption characteristics than at least one print agent specified prior to modification of the print instructions. In some examples, predetermined print instructions may comprise print instructions for printing over a layer of build material and the modification may apply to just part of the print instruction, for example the print instructions relating to the region associated with the determine over-temperature condition, for example to the region of a hot spot. In other examples, print instructions may be determined based on a model and the temperature condition, such that print agents to be applied to at least a region of the subsequent layer is affected by the presence of the temperature condition.

While an over-temperature condition could for example be addressed by reducing the ambient temperature, or reducing the amount of energy applied to a layer by a heat lamp or the like, these solutions may be relatively difficult to accurately control and their effect may apply to the whole of the layer, and indeed may apply to the whole object or objects being manufactured. As a result, this may cause other detrimental effects such as 'unmelting', in which melting of a region of the object is incomplete, shrinkage, warpage, excessive cooling, and the like. Determining print instructions however may allow for a fine-grained response, which in some examples may be applied to just the regions of the layer which are subject to, or are likely to be subject to, an over- or under-temperature condition.

Thus, in this example, an under- or over-temperature condition seen or anticipated for a layer may be addressed by determining (which in some examples comprises modifying) print instructions for applying print agent to that layer. This may address or counteract consequences of departure in an anticipated thermal condition without unduly impacting the layer. In some examples, while at least some unintended fusing may result in the subsequent layer, determining the print agent instructions for that layer based on the temperature condition may prevent or counteract uncontrolled thermal contribution across multiple layers. For example, if printing were to continue as originally intended following the formation of a hot spot, this may mean that heat builds further in the region of the hot spot and unintended fusing and/or unintended physical properties may propagate though multiple layers.

In some examples, the method may further comprise forming a subsequent layer of build material (which may be formed either before or after the temperature(s) are measured) and printing the subsequent layer with print agents according to the determined print instructions. In some examples, the subsequent layer may then be treated as the first layer in FIG. 1, and the method may be carried out in relation to each, or at least some, of the layers in formed in additive manufacturing.

As such 'hot spots' can be formed over multiple layers, it may be that the method is not carried out for each layer. For example, the method may be carried out on alternate layers, or every third layer, or every tenth layer, or the like. Applying the process in relation to some layers and not all layers may reduce processing without unduly risking adverse effects of hot spots. In some examples, as such hot spots are more likely to result when manufacturing a bulk portion of an object (i.e. when causing a relatively large, substantially continuous, volume of the build material to fuse), the method may be carried out in association with layers which form such a portion. For example, object data may be analysed to determine portions above a particular volume (which may be predetermined, for example based on predicted thermal behaviour), and the method carried out in association with layers which are close to such an object portion. More generally, the method may be carried out in relation to layer(s) which are associated with a relatively high risk of a hot spot, and not in relation to layer(s) which are associated with a relatively low risk of a hot spot.

Figure 2A:
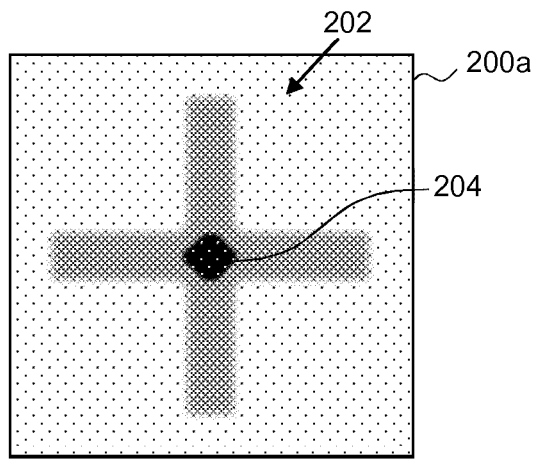
FIGS. 2a-2c are schematic diagrams of example thermal maps.
Figure 2B:
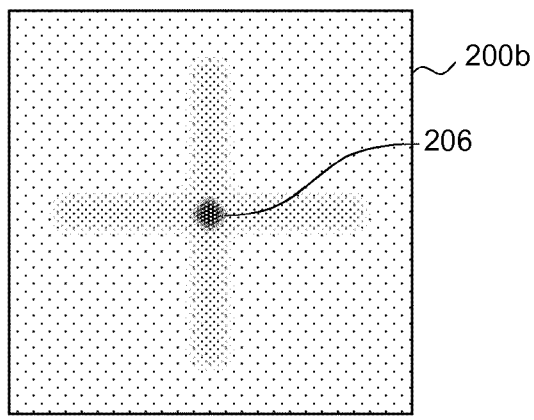
Figure 2C:
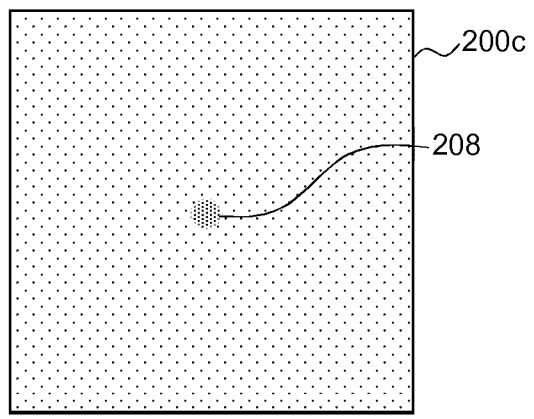

FIGS. 2a-c show examples of temperature measurements over the surface of a layer of build material as 'thermal maps' 200a-c. Such maps may represent a plurality of imaging pixels, each of which is associated with a temperature measurement. In the Figures, a higher temperature is indicated as a darker region, and a lower temperature is indicated as a lighter region.

FIG. 2a shows a thermal map 200a of a layer of build material which has been treated with fusing agent and heated with a heat lamp. For the purposes of this example, an object being formed in this layer comprises a cross shape cross section 202. As is shown by the darker region, the layer of build material is hotter over the cross shape than in the surrounding region. Moreover, there is some variability in the temperature of the cross shape 202, with a central region 204 being hotter than the surrounding 'arms' due to the thermal contributions from all sides. Therefore, there is a relatively hot spot at the centre of the cross shape 202. The temperature of the surrounding unfused build material is lower than in the fused region. It should be noted that, in practise, there may be more variation in temperature, which is not shown in the figures to avoid overcomplicating them.

FIG. 2b shows a thermal map 200b of a layer of build material formed over the layer shown in FIG. 2a, and before any print agent is applied thereto. In forming this layer, there may be some preheating of the build material, which may for example be formed using a roller or like. In this example, the cross shape heat pattern from FIG. 2a has to some extent 'bleed through', i.e. there is a noticeable thermal contribution from the underlying layer in a region thereof. This is particularly the case in the region of a hot spot 206 overlying the central region 204, which is hotter than the surrounding portions. In some examples, such heating may be sufficient to cause fusion of this layer, even without the usual processing of applying print agents and energy. This may mean that portions of the layer fuse where fusion is not intended, and/or unintended physical properties result. Moreover, if a predetermined print instruction for printing on this layer is carried out, the over-temperature condition may be exacerbated by the addition of further print agent, and the issue may build though successive layers. This may be the case where the print agent applied to an underlying layer diffuses into the subsequent layer (as may occur in particular if both are at least partially molten at one time). In that case, when the subsequent layer is treated with print agent, it will contain not just the applied print agent but the diffused print agent, which may mean that it will bear more than the intended concentration of fusing agent, resulting in increased energy absorption. In some cases, for example where the agents are pigmented, this effect may be due to or exacerbated by colour difference leading to a different heat absorption.

In some examples, the thermal map of FIG. 2b may be used to determine temperature condition indicative of a departure from an anticipated thermal contribution of the first layer exists by comparing the measured temperatures with a threshold temperature (although in other examples, the thermal map of FIG. 1a could be used to determine the existence of the temperature condition indicative of a departure from an anticipated thermal contribution between layers). Considering the example of FIG. 2b, it may be the case that the threshold temperature is exceeded in the region of the hot spot 206. For example, a threshold temperature may be set in relation to a melting temperature associated with the combination of materials used to form that layer of the object. It may be the case that the threshold temperature is set to be below the melting temperature by a predetermined amount, with the aim of preventing any unintended fusing. This allows action to be taken to counter the effect of hot spots building over successive layers before the detrimental effects thereof result. In other examples, the threshold may be related to a temperature associated with particular object properties, such as strength, resilience or the like. For example, where the build material is a plastic powder, the materials may be associated with a melting temperature of around 160-190° C. In such an example, it may be that any temperature of around 10° C. less than the melting temperature associated with the combination of materials used is indicative of a departure from an anticipated thermal contribution from an underlying layer.

In other examples, a model of an anticipated thermal contribution may exist, for example in the form of a model, or anticipated, thermal map 200c for that layer, an example of which shown in FIG. 2c. The model thermal map 200c of FIG. 2c anticipates a heated region 208, but, as can been seen from the lighter shading, this anticipated heating is lower than the actual temperature measured in the hot spot 206. In some examples, a difference between the measured and anticipated thermal maps may be determined. This difference may be used to determine that a temperature condition departs from an anticipated temperature condition (for example, based on a threshold difference), and/or to determine a modification, or a filter may be applied thereto to identify differences which are greater than a predetermined threshold (which may be related to the accuracy of the temperature sensing apparatus with, for example, temperature differences which are within the error bands of the apparatus being disregarded).

Figure 3:
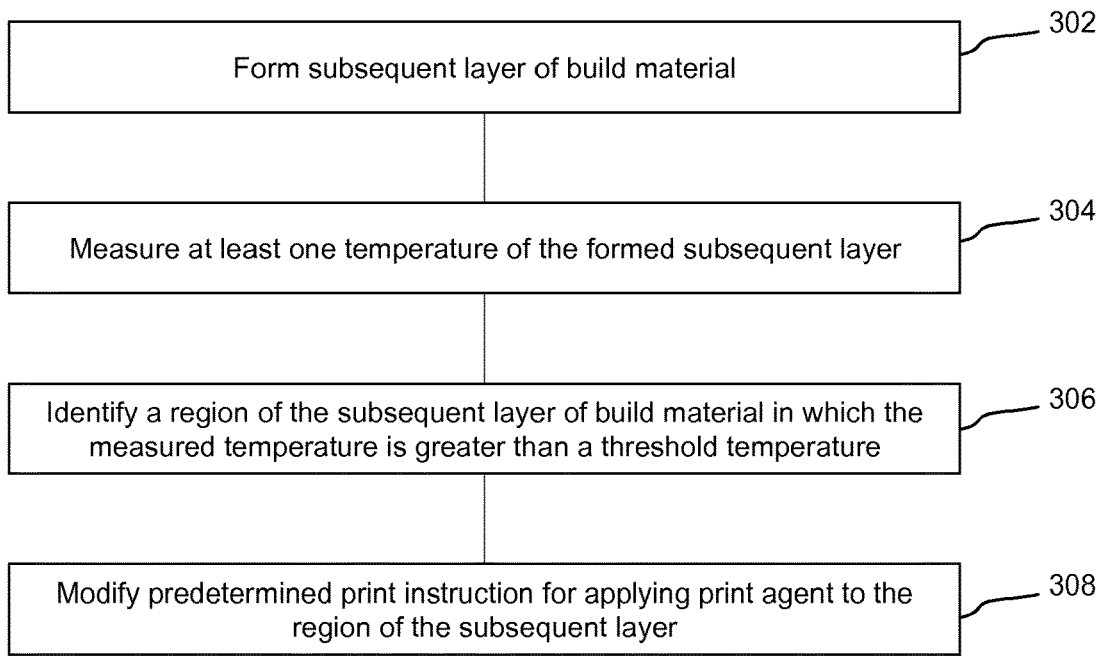
FIG. 3 is a flowchart of another example method of determining a print instruction for applying print agent.

FIG. 3 is an example of a method, which may be a method of additive manufacturing, and which may for example follow blocks 102-106 of FIG. 1.

In block 302, a subsequent layer of build material is formed, and in block 304, at least one temperature of the formed subsequent layer is measured. Block 306 comprises identifying a region of the subsequent layer of build material in which the measured temperature is greater than a threshold temperature. Block 308 comprises modifying a predetermined print instruction for applying print agent to the identified region of the subsequent layer. The amount of print agent may be an amount (e.g. a concentration, density and/or contone level) of fusing agent and/or an amount of modifying agent. In other examples, the type or class of print agent may be modified.

By measuring the temperature of the subsequent layer, for example before any print agents are applied thereto, the real life, instant thermal contribution may be determined, which relates to the actual content of the subsequent layer and the instant environmental conditions.

Block 306 may comprise determining a function based on the measured temperatures. For example, such a function may vary over space (for example over X and Y axes, where the layer is formed in an XY plane) and may represent or be based on a thermal map, and/or a difference between at least one measured temperature and at least one of a threshold and anticipated temperature. The magnitude of the function at each location may be indicative of a degree of departure from the anticipated thermal contribution of the previous layer, which may for example be a constant temperature value over the layer, or a modelled temperature value which may vary over the layer. In some examples, modifying the predetermined print instruction for applying print agent to the subsequent layer in block 308 may comprise convolving the function and the predetermined print instructions for the subsequent layer. Thus at least one print agent may be modified by an amount related to the magnitude of the function at a corresponding location. In some examples, a plurality of functions may be developed from the measured temperature(s). In other examples, the functions may be convolved with model data when determining print instructions.

In another example, block 308 may comprise applying a mask to predetermined print instructions for applying print agent to the subsequent layer. For example, the mask may have a value which varies with location. In some locations, the mask may have no effect on the predetermined print instructions, whereas the other locations the mask may have a modifying effect, for example adjusting an existing print agent amount by a particular value (which may vary between regions or locations). In other words, a mask may be indicative of least one portion of the print instructions to be modified and/or at least one portion of the print instructions to be left unmodified.

In some examples, a plurality of masks, which may relate to different print agents and/or different passes of an agent distributor (such as a print head) over the build material, may be developed. The mask(s) may be based on the measured temperatures, or on determined temperature differences, such that the magnitude of the temperature or temperature difference is associated with a value or an effect of the mask.

For example, a superposition of a thermal image of the layer before print agent is applied and the print instructions representing the print agent to be applied to the layer may be determined. If, for example, the layer is considered as an XY plane, the X and Y position delineating the areas where print agent is to be modified may be determined and the modification applied to the print instructions relating to those regions.

The amounts of each print agent (or the modifications made thereto) may for example be determined based on thermal models relating to the effect of a particular amount of print agent being applied, or based on data developed using machine learning techniques to determine how an amount or a change in an amount may impact the temperature. In some examples, the amounts may modified in a stepwise manner until an intended state is reached. In some examples, models in relation to the thermal effects of modifying amounts of fusing agents, modifying agents and combinations of both may be developed.

Blocks 304, 306 and 308 therefore may respectively provide examples of blocks 108, 110 and 112 of FIG. 1, and may follow blocks 102-106 of FIG. 1. As noted above, in another example, block 108 may comprise identifying a region of the subsequent layer of build material in which the measured temperature differs from an anticipated temperature by more than a threshold amount.

Figure 4:
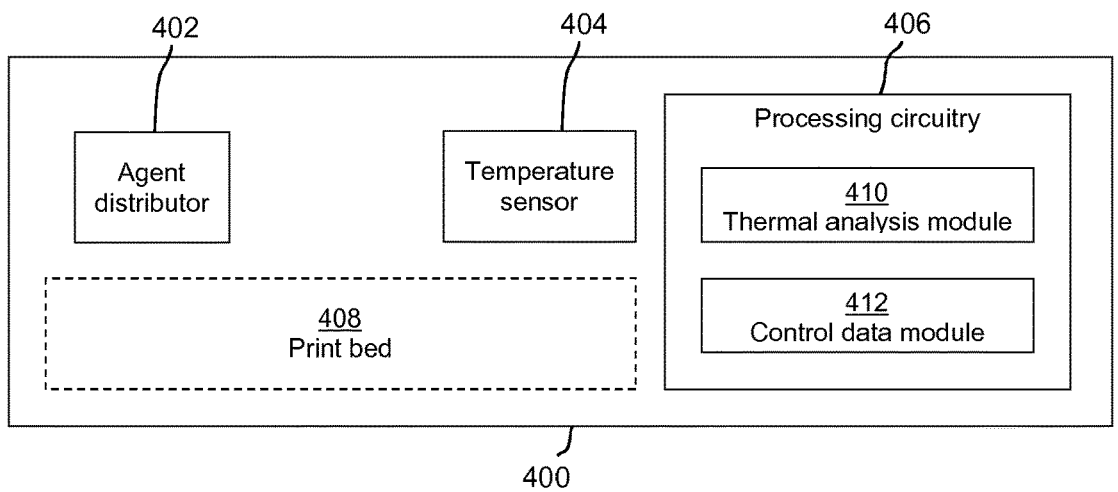
FIG. 4 is a simplified schematic drawing of an example additive manufacturing apparatus.

FIG. 4 is an example of an additive manufacturing apparatus 400 comprising a print agent distributor 402, a temperature sensor 404 and processing circuitry 406. A print bed 408, which may be a removable component (for example being provided as part of a trolley), may be provided in use of the additive manufacturing apparatus 400 to support a layer of build material. The print agent distributor 402 may be controlled to selectively print a print agent onto a layer of build material on the print bed 408, for example according to a predetermined pattern. For example, the print agent distributor 402 may comprise a print head carriage and/or a print head, such as an ink jet print head, and may apply the print agent(s) as a liquid, for example in one or more passes over the print bed 408. The temperature sensor 404, which may be a thermal camera, a thermal imaging array or the like, measures the temperature of each of a plurality of locations (e.g. thermal imaging pixels) over the layer of build material. The temperature sensor 404 may be controlled to measure the temperature of each of a plurality of locations over a layer of build material formed on the print bed before the print agent distributor 402 applies print agent thereon.

In some examples, the additive manufacturing apparatus 400 may comprise a build material distributor, which may be arranged form a plurality of layers of build material on the print bed 408, for example comprising a roller to spread build material across the print bed 408. In some examples, a removable component on which the print bed 408 is provided may also comprise a source of build material, and may comprise a mechanism to lift the build material and prepare it so the build material distributor can spread the build material on the print bed 408.

The processing circuitry 406 comprises a thermal analysis module 410, and a control data module 412. The thermal analysis module 410 is arranged to determine, using measurements of the temperature sensor 404, if a thermal contribution of a first layer of build material to a region of a subsequent layer of build material to be processed in object generation exceeds a threshold. For example, the thermal analysis module 410 may be arranged to carry out blocks 108 or 306 as set out above. The control data module 412 is arranged to determine, based on an output of the thermal analysis module 410, control data for printing fusing agent onto the subsequent layer. For example, the control data module 412 may be arranged to carry out blocks 110 or 308 as set out above.

In some examples, the control data module 412 may be arranged to modify predetermined control data if the thermal analysis module 410 identifies at least one region in which the thermal contribution of a first layer of build material to a subsequent layer of build material to be processed in object generation exceeds a threshold. These layers may be adjacent or may be separated by at least one intervening layer. The thermal effect of a first layer may be a cumulative effect of heat built up over several layers which are thermally coupled to the first layer.

In some examples, the thermal analysis module 410 may be arranged to determine if a thermal contribution of a first layer of build material on a region of a subsequent layer of build material to be processed in object generation exceeds a threshold using a thermal model. For example, a difference between a measured temperature and an anticipated temperature may be determined.

The temperature sensor 404 may also be used in controlling other aspects of the apparatus, for example to provide feedback to a heat source for pre-heating build material; to provide feedback to a heat source for applying energy to cause coalescence such that an object generation temperature is reached and not unduly exceeded; and/or to determine when a generated object is cooled. The temperature sensor 404 may be further used to measure the temperature of other parts of an additive manufacturing apparatus, for example a temperature of a spittoon, a web wipe or of a drop detector.

Figure 5:
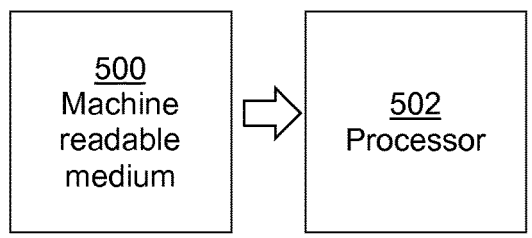
FIG. 5 is a simplified schematic drawing of an example processor associated with a machine readable medium.

FIG. 5 is an example of a machine readable medium 500 associated with a processor 502. The machine readable medium 500 comprises instructions which, when executed by the processor 502, cause the processor 502 to determine, based on temperature measurements over a subsequent layer of build material in a layer-wise additive manufacturing process, the subsequent layer overlying a previous layer of build material having been printed with print agents to cause selective solidification thereof, a temperature condition indicative of heating by the previous layer of a region of the subsequent layer which exceeds a threshold (for example, determining a 'hot spot'); and to determine print instructions for applying print agent to the subsequent layer of build material.

In some examples, the instructions to determine print instructions comprise instructions to modify predetermined print instructions to result in at least one of a reduction of the amount (which may be a number of drops per unit area, or a concentration) of a fusing agent or fusion enhancing agent to be applied; an increase in an amount of fusion-reduction agent to be applied; or a change in a print agent to be applied to the region. In some examples, the instructions to determine a temperature condition indicative of heating by the previous layer of the subsequent layer which exceeds a threshold are to determine the temperature condition based on a model predicting heating by the previous layer of the subsequent layer.

In some examples set out herein, in this situation, dynamic adjustments to print agent amounts are triggered by temperature sensors such as a thermal imaging camera or other IR sensors. In some examples, the temperature sensors may be used to detect hot spots, which may be determined relative to absolute thresholds (for example, detecting thermal gradients) or relative to anticipated temperatures. An adjustment to a print agent amount may be applied. The amount, or the amount of adjustment (which may be a reduction or increment) may be determined to stabilize the temperature of the hot spot without altering (or without substantially altering) the thermal stability of the rest of the print bed. In some examples, the amount of print agent, or the amount of adjustment may for example be determined using a threshold based method or a more complex method such as a proportional-integral-derivative (PID) control based calculation or by following a statistical approach (for example based on machine learning, which may be able to consider the thermal behaviour of a plurality of layers in order to cause the thermal behaviour to converge to an intended state rapidly, and in some examples, before a problematic thermal condition can develop).

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus (such as the processing circuitry 406, the thermal analysis module 410 and control data module 412) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. An additive manufacturing apparatus comprising:
    an agent distributor to selectively apply liquid fusing agent to a first layer of build material formed on a print bed according to print instructions for the first layer;
    an energy source to apply energy to fuse at least one region of the build material receiving the applied fusing agent;
    a temperature sensor to measure a temperature of each of a plurality of locations of the first layer of build material formed on the print bed; and
    processing circuitry comprising:
        a thermal analysis module programmed to determine, using the measurements of the temperature sensor, if a thermal contribution of the first layer of build material to a region of a subsequent layer of build material to be processed in object generation according to print instructions for the subsequent layer exceeds a threshold temperature; and
        a control data module programmed to determine, based on the determination of the thermal analysis module, control data for applying fusing agent to the region of the subsequent layer, and to adjust the print instructions for the subsequent layer by reducing an amount of the fusing agent to be applied to the region of the subsequent layer if the thermal contribution exceeds the threshold temperature.

2. An additive manufacturing apparatus according to claim 1 in which the control data module is programmed to modify the print instructions for the subsequent layer if the thermal analysis module identifies at least one region of the plurality of locations in which the thermal contribution of the first layer of build material to the subsequent layer of build material to be processed in object generation exceeds the threshold temperature.

3. An additive manufacturing apparatus according to claim 1 in which the thermal analysis module is programmed to determine if the thermal contribution of the first layer of build material to the subsequent layer of build material to be processed in object generation exceeds the threshold temperature based on a thermal model.

4. An additive manufacturing apparatus according to claim 1 in which the temperature sensor is configured to measure the temperature of each of a plurality of locations of the subsequent layer of build material to be processed in object generation before fusing agent is applied thereto.

5. An additive manufacturing apparatus according to claim 1 in which the temperature sensor comprises a thermal imaging camera.

6. An additive manufacturing apparatus according to claim 1, wherein the control data module is programmed to adjust the control data by:
    an increase in an amount of fusion-reduction agent to be applied to the region of the subsequent layer.

7. An additive manufacturing apparatus according to claim 1, wherein the control data module is programmed to adjust the print instructions for the subsequent layer by adjusting a contone level of the fusing agent to be applied to the region of the subsequent layer if the thermal contribution exceeds the threshold temperature.

8. An additive manufacturing apparatus according to claim 1, wherein the control data module is programmed to reduce the amount of fusing agent to be applied to the region of the subsequent layer where the thermal contribution of the first layer exceeds the threshold temperature, if the thermal contribution exceeds the threshold temperature.

9. An additive manufacturing apparatus according to claim 1, wherein the control data module is programmed to adjust the print instructions for the subsequent layer by adjusting a concentration of the fusing agent to be applied to the region of the subsequent layer if the thermal contribution exceeds the threshold temperature.

10. An additive manufacturing apparatus according to claim 1, wherein the control data module is programmed to adjust the amount of the fusing agent to be applied to the region of the subsequent layer with a proportional-integral-derivative (PID) calculation.

11. An additive manufacturing apparatus according to claim 1, wherein the control data module is programmed to adjust the print instructions for the subsequent layer by applying a mask to the print instructions for applying the fusing agent to the region of the subsequent layer.

12. A method of using the additive manufacturing apparatus according to claim 1, the method comprising:
    forming the first layer of build material;
    selectively applying the fusing agent to the first layer based on the print instructions for the first layer;
    applying the energy to the first layer to cause fusion in the at least one region thereof;
    measuring the temperature of each of the plurality of locations of the first layer;
    determining, using the thermal analysis module, if a thermal contribution of the first layer to the region of the subsequent layer of build material to be processed in object generation according to print instructions for the subsequent layer exceeds the threshold temperature; and
    determining, using the control data module, the control data for applying fusing agent to the region of the subsequent layer.

13. A method according to claim 12 further comprising forming the subsequent layer of build material and measuring the temperature of at least one location of the subsequent layer before any of the fusing agent is applied thereto.

14. A method according to claim 13 in which determining if the thermal contribution of the first layer of build material to the region of the subsequent layer of build material exceeds the threshold temperature comprises identifying the region of the subsequent layer of build material to be processed in which the threshold temperature would be exceeded.

15. A method according to claim 12 in which determining the control data for applying fusing agent to the region of the subsequent layer comprises modifying the print instructions for the subsequent layer.

16. A method according to claim 12 in which determining if the thermal contribution of the first layer of build material to the region of the subsequent layer of build material exceeds the threshold temperature comprises identifying the region of the subsequent layer of build material in which the threshold temperature would be exceeded.

17. A method according to claim 12 further comprising determining a function based on the at least one of the measured temperatures and in which determining the control data for applying fusing agent to the region of the subsequent layer comprises convolving the function and the print instructions for the subsequent layer.

18. A method according to claim 12 in which determining the control data for applying fusing agent to the region of the subsequent layer comprises modifying the print instructions for the subsequent layer by applying at least one mask to the print instructions for the subsequent layer, wherein the mask is indicative of at least one of:
- at least one portion of the print instructions for the subsequent layer to be modified by said modification; and
- at least one portion of the print instructions for the subsequent layer to be left unmodified by said modification.

* * * * *